(12) United States Patent
Dietrich et al.

(10) Patent No.: US 9,413,753 B2
(45) Date of Patent: Aug. 9, 2016

(54) METHOD FOR GENERATING A SOFT TOKEN, COMPUTER PROGRAM PRODUCT AND SERVICE COMPUTER SYSTEM

(75) Inventors: Frank Dietrich, Berlin (DE); Micha Kraus, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 272 days.

(21) Appl. No.: 14/241,909

(22) PCT Filed: Aug. 22, 2012

(86) PCT No.: PCT/EP2012/066324
§ 371 (c)(1),
(2), (4) Date: Mar. 26, 2014

(87) PCT Pub. No.: WO2013/030060
PCT Pub. Date: Mar. 7, 2013

(65) Prior Publication Data
US 2014/0215589 A1  Jul. 31, 2014

(30) Foreign Application Priority Data

Sep. 2, 2011 (DE) .......................... 10 2011 082 101

(51) Int. Cl.
*H04L 29/06* (2006.01)
*G06F 21/34* (2013.01)
*G06F 21/41* (2013.01)

(52) U.S. Cl.
CPC ............ *H04L 63/0838* (2013.01); *G06F 21/34* (2013.01); *G06F 21/41* (2013.01);

(Continued)

(58) Field of Classification Search
CPC . H04L 63/0838; H04L 63/0853; H04L 63/18; H04L 63/0815; H04L 63/0823; H04L 63/0407; G06F 21/34; G06F 21/41
See application file for complete search history.

(56) References Cited

U.S. PATENT DOCUMENTS

2005/0015593 A1  1/2005 Cheng
2005/0188219 A1  8/2005 Annic
(Continued)

FOREIGN PATENT DOCUMENTS

DE  10 2008 000 067  7/2009
DE  10 2008 040 416  1/2010
(Continued)

OTHER PUBLICATIONS

European Patent Office, International Search Report, PCT/EP2012/066324, Dec. 21, 2012.
(Continued)

*Primary Examiner* — Matthew Smithers
(74) *Attorney, Agent, or Firm* — Leveque Intellectual Property Law, P.C.

(57) ABSTRACT

A method is provided for generating a soft token by which attributes of a user may be authenticated. A request to generate the soft token is transmitted from an electronic device of the user to a service provider computer via a first secure connection. After receiving the request, the service computer generates a one-time password, records the password as a session identifier, and transmits the password to the electronic device. The password is output by the electronic device via a user interface. The user enters the password into a user computer system, from where it is transmitted, via a second secure connection, to the service computer system. If the recorded password agrees with the received password, one or more attributes are read from an ID token of the user and a corresponding soft token is generated and transmitted to the electronic device or user computer system.

17 Claims, 8 Drawing Sheets

(52) U.S. Cl.
CPC ........ *H04L63/0815* (2013.01); *H04L 63/0853* (2013.01); *H04L 63/18* (2013.01); *H04L 63/0407* (2013.01); *H04L 63/0823* (2013.01)

(56) References Cited

U.S. PATENT DOCUMENTS

| | | |
|---|---|---|
| 2009/0158033 A1 | 6/2009 | Jeong |
| 2009/0193250 A1 | 7/2009 | Yokota et al. |
| 2010/0199086 A1 | 8/2010 | Kuang et al. |
| 2010/0262834 A1 | 10/2010 | Freeman |
| 2011/0258452 A1 | 10/2011 | Coulier |
| 2012/0084565 A1 | 4/2012 | Wittenberg |
| 2012/0167186 A1* | 6/2012 | Dietrich ............... G06F 21/34 726/6 |
| 2012/0174193 A1* | 7/2012 | Dietrich ............... G06F 21/33 726/4 |
| 2012/0185398 A1 | 7/2012 | Weis |
| 2013/0047223 A1 | 2/2013 | Headley |
| 2013/0227291 A1 | 8/2013 | Ahmed |
| 2013/0318354 A1 | 11/2013 | Entschew |

FOREIGN PATENT DOCUMENTS

| | | |
|---|---|---|
| DE | 10 2008 042 262 | 4/2010 |
| DE | 10 2008 042 582 | 4/2010 |
| DE | 10 2009 026 953 | 12/2010 |
| DE | 10 2009 027 681 | 1/2011 |
| DE | 10 2009 027 682 | 1/2011 |
| DE | 10 2009 027 723 | 1/2011 |
| DE | 102009027686 | 1/2011 |
| DE | 102009046205 | 5/2011 |
| DE | 10 2010 028 133 | 10/2011 |
| DE | 10 2011 082 101 | 3/2013 |
| EP | 1 868 131 | 12/2007 |

OTHER PUBLICATIONS

BSI: Technical Guideline eID-Server, BSI TR-03130-1, Version 2.0.1, Jan. 15, 2014 (English version of BSI: "Technische Richtlinie eID-Server", Bundesamt fur Sicherheit in Der Informationstechnik, Bonn, vol. BSI TR-30130, No. Version 1.0 RCI, May 19, 2009, pp. 1-48, also attached).

Morgner, Frank, http://vsmartcard.sourceforge.net/npa/README.html, nPA Smart Card Library, Dec. 8, 2013.

WIPO, International Preliminary Report on Patentability, PCT/EP2012/066324, Mar. 13, 2014, English translation.

Schroder, M., "SAML Identity Federation und die eID-Funktionalitat des nPA", www.sar.informatik.hu-berlin.de/research/publications/SAR-PR-2011-08/saml_pdf, Jun. 13, 2011, no translation available.

Paquin et al., U-Prove Crytographic specification V1.1 Revision 3, http://research.microsoft.com/apps/pubs/default.aspx?id=166969, Dec. 2013.

Bundesamt fur Sicherheit in der Informationstechnik, "Technical Guideline TR-031121", https://www.bsi.bund.de/SharedDocs/Downloads/DE/BSI/Publikationen/TechnischeRichtlinien/TR03112/api1_teil7_pdf.pdf?_blob=publicationFile, Version 1.1.5 draft, Apr. 7, 2015.

* cited by examiner

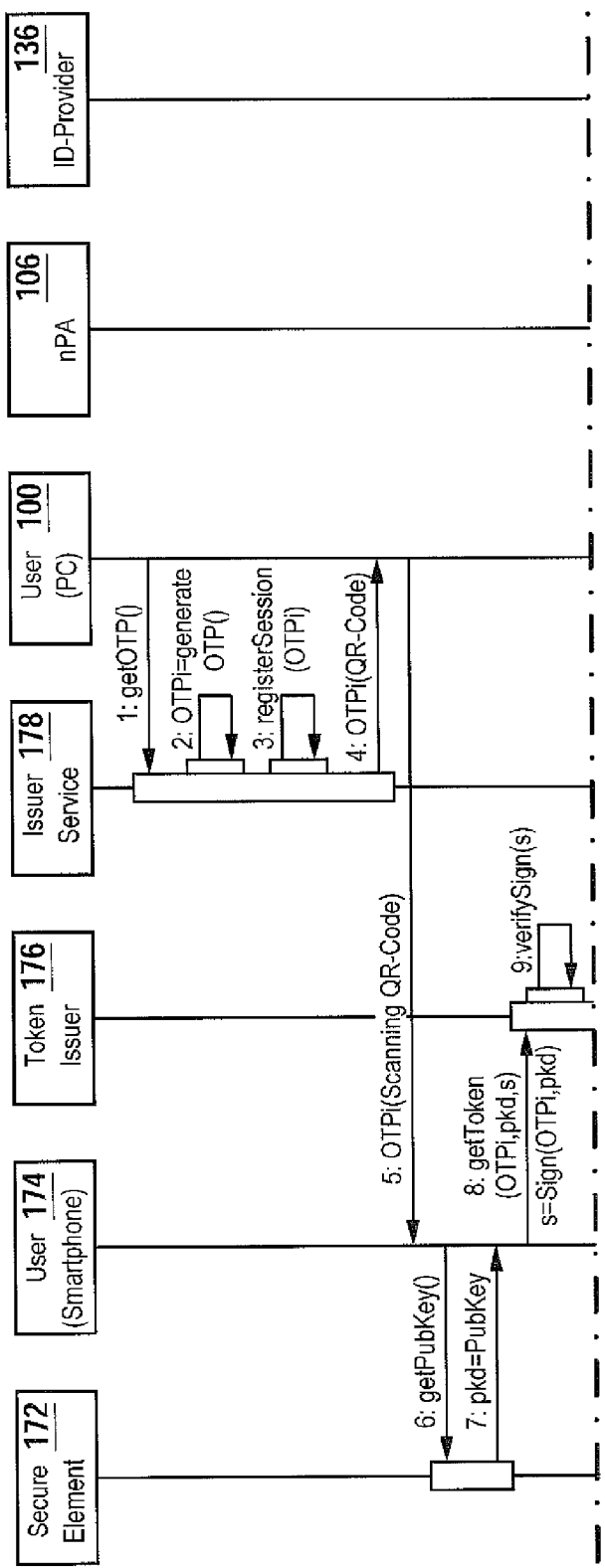

METHOD FOR GENERATING A SOFT TOKEN, COMPUTER PROGRAM PRODUCT AND SERVICE COMPUTER SYSTEM

PRIORITY CLAIM

This application claims benefit of foreign priority in accordance with 35 U.S.C. 119(b) to German application No. 10 2011 082 101.5 filed Sep. 2, 2011.

BACKGROUND

The invention relates to a method for generating a soft token, to a computer program product, to a service computer system, and to a data processing system.

The use of soft tokens, which are also referred to as software tokens, for authentication purposes is known per se from the prior art. A disadvantage of soft tokens is that copies thereof can be made. This poses potential for the misuse of soft tokens.

In particular soft tokens according to the U-Prove standard, which are referred to as U-Prove tokens, are known from the prior art. Such a U-Prove token can be protected by hardware by dividing the private key of a U-Prove token between two devices (see in this regard U-Prove Technology Overview V1.1, Draft Revision 1, Microsoft Corporation 2011, Section 6 on page 18).

It is therefore an object of the invention to create an improved method for generating a soft token, a computer program product, a service computer system, and a data processing system.

DESCRIPTION

The objects of the invention are achieved by the features of the independent claims. Embodiments of the invention are described in the dependent claims.

Embodiments of the invention are particularly advantageous since an ID token of a user is used as the data source for generating the soft token, and the soft token is cryptographically tied to a secure element of the same user, so as to ensure maximum security in this way, while ensuring convenient handling.

According to the invention, a "soft token" shall be understood to mean in particular signed data that can be used to authenticate a user, in particular U-Prove tokens.

The signed data can in particular include one or more attributes of a user, which are signed by a trusted third party.

According to the invention, a "secure element" shall be understood to mean in particular a device having at least one protected memory area in which data are stored in such a way that they are protected against manipulation and mining, such as a chip card, in particular a subscriber identity module (SIM) card, a USB stick, a trusted platform module (TPM) or another device having a memory area that is protected by hardware and/or software measures. For example, the secure element has a card-like design, so that a user can easily carry it.

According to the invention, a "cryptographically secure connection" shall be understood to mean a connection in which the data transmitted via the connection are encrypted so as to protect them against manipulation and/or mining, and in particular copying. An asymmetric or a symmetric encryption method, in particular a DiffieHellman (DH) key exchange, may be used to establish a cryptographically secure connection.

According to the invention, a "service computer system" shall be understood to mean in particular a computer system that is used to deliver a service, which is to say the generation of a soft token for a user.

According to the invention, a "one-time password" (OTP) shall be understood to mean in particular a one-time access code or a one-time keyword, which is generated with the aid of a password generator, for example. An OTP is used for authentication purposes and is only valid for a single event, which is to say it cannot be used a second time. A user must enter a correct one-time password to authenticate himself.

According to the invention, a "user computer system" shall be understood to mean in particular a personal computer (PC), a laptop computer or another computer of a user, such as an electronic device that has the functionality of a mobile computer, in particular a smart phone or another portable computer.

According to the invention, an "ID token" shall be understood to mean in particular a portable electronic device, such as a so-called USB stick, or a document, in particular a value or security document. The ID token has an electronic memory in which at least one attribute is stored.

According to the invention, a "document" shall be understood to mean in particular paper-based and/or plastic-based documents, for example identification documents, in particular passports, identification cards, visas as well as driver's licenses, vehicle registrations, vehicle titles, company ID cards, health insurance cards or other identification documents, and also chip cards, payment instruments, in particular bank notes, bank cards and credit cards, bills of lading or other proofs of authorization, in which a data memory for storing the at least one attribute is integrated.

According to embodiments of the invention, the user is the owner of an ID token, such as an electronic identification document, in particular an electronic passport or an electronic identification card. The user further has a secure element, such as a chip card. The secure element includes a protected memory area, in which a secret key of a first asymmetric cryptographic key pair is stored.

A first cryptographically secure connection, via which the user requests the generation of the soft token, is established between an electronic device of the user and a service computer system.

The electronic device can be a mobile terminal, in particular a mobile communication device, a mobile telephone, a smart phone, a portable computer, a user computer system or another mobile battery-operated terminal having a communication interface to the secure element.

The communication interface is preferably designed to establish a local connection to the secure element, such as a conventional or contact-less chip card interface. The electronic device is particularly preferably a mobile telephone, in particular what is known as a smart phone, and the secure element is a telecommunications chip card, in particular a SIM card, which is located in an integrated chip card reader of the electronic device.

After receiving the request for the generation of the soft token, the service computer system generates a one-time password with the aid of a corresponding password generator and records the generated one-time password as an identifier of the first connection for establishment of a session. The one-time password is transmitted via the first connection to the electronic device of the user and is output by the electronic device via a user interface. For example, the one-time password is displayed on a display of the electronic device, so that a user can read the one-time password from the display.

A second cryptographically secure connection is established between the user computer system and the service computer system. The user enters the one-time password output via the user interface of the electronic device into his user computer system, so that this one-time password is transmitted from the user computer system to the service computer system via the second connection. The "transmission of the one-time password" in the present invention shall also be understood to mean that the user computer system derives an identifier from the one-time password according to a predetermined algorithm, and that this identifier, and not necessarily the one-time password itself, is transmitted via the second connection.

The service computer system then checks whether the recorded and sent one-time password agrees with the received one-time password, or with the identifier derived therefrom. Only if this is the case is at least one attribute read from the ID token of the user and the soft token generated, wherein the public key of the first cryptographic key pair is also included in the generation of the soft token. The soft token thus generated is then transmitted via the first connection to the electronic device and/or via the second connection to the user computer system of the user, which is to say within the now successfully established session, which includes the first and second connections.

This is particularly advantageous since it is not only ensured that one and the same user is in fact the owner of both the ID token and the secure element, but also that the attributes that are included in the generation of the soft token in fact belong to this user.

According to one embodiment of the invention, the one-time password is displayed on the display of the electronic device, or of the user computer system, in the form of a machine-readable optical pattern, in particular in the form of a one- or two-dimensional bar code, or as a matrix bar code, in particular a QR code. The one-time password can then be entered by the user by the user taking a digital photo of the machine-readable optical pattern, for example by way of a digital camera that is integrated into the electronic device or the user computer system. The machine-readable optical pattern is then automatically decoded, so that the manual entering of the one-time password by the user is dispensed with. This has in particular the advantage that longer one-time passwords can be used, which further increases the security of the method according to the invention.

According to one embodiment of the invention, the secure element has a readily readable memory area in which a public key of the first key pair is stored. This public key is transmitted from the secure element to the electronic device via the local connection, which is to say not via a network connection, but via a wireless or conventional chip card interface, for example. The public key is then transmitted from the electronic device to the service computer system via the first cryptographically secure connection. The one-time password generated by the service computer system is encrypted with this public key, and the resulting ciphertext is transmitted from the service computer system to the electronic device via the first connection.

The encrypted one-time password is then forwarded from the electronic device via the local connection to the secure element, where it is decrypted with the aid of the secret key. The decrypted one-time password is then transmitted from the secure element to the electronic device via the local connection, so that the electronic device can output the one-time password via its user interface.

Embodiments of the invention are particularly advantageous since the soft token is cryptographically tied to the secure element, whereby the soft toke has similar or the same trustworthiness as the ID token, without being physically tied to the secure element. For example, the soft token can be stored on the secure element itself, the electronic device of the user, the user computer system or in another electronic memory, since in addition to the soft token, also the presentation of the secure element is required for authentication of the user, for example so as to demonstrate in a challenge-response protocol that the secure element is in possession of the private key of the first key pair, the public key of which was included in the generation of the soft token. Such a presentation of the soft token and of the secure element for the purpose of authenticating the user can take place according to the U-Prove protocol, for example.

According to one embodiment of the invention, the service computer system comprises a first program component for generating the one-time password, for encrypting the one-time password and for generating the soft-token. The first program component can thus in particular include a password generator for generating the one-time password. The service computer system further comprises a second program component for receiving the one-time password from the user computer system, wherein the first connection is established between the electronic device and the first program component, and the second connection is established between the user computer system and the second program component.

According to one embodiment of the invention, only the user computer system is present on the user side, without a separate electronic device. For example, the user computer system can be a smart phone, which has both the functionalities of a user computer system and of a mobile telephone, such as an iPhone or iPad. In this case, the first and second cryptographically secure connections would be established as two different sessions between the service computer system and the user computer system, for example.

According to one embodiment of the invention, the at least one attribute is read from the ID token with the aid of an ID provider computer system.

According to the invention, an "ID provider computer system" is understood to mean in particular a computer system that has an authorization certificate, in which an authorization for reading the at least one attribute from the ID token of the user is specified. The ID provider computer system can be designed according to DE 10 2008 000 067 A1, DE 10 2008 040 416, DE 10 2008 042 262, DE 10 2009 026 953, DE 10 2009 027 723, DE 10 2009 027 681 and/or DE 10 2010 028 133.6, for example.

A "certificate" here shall be understood to mean a digital certificate, which is also referred to as a public key certificate. A certificate encompasses structured data that are used to associate a public key of an asymmetric cryptographic system with an identity, for example a person or a device. The certificate can, for example, correspond to the X.509 standard or another standard. It can notably be an SSL certificate or a TLS certificate.

An "authorization certificate" here shall be understood to mean a certificate that includes a specification of access rights to attributes stored in the ID token. An authorization certificate may include a reference to one or more certificates, in particular SSL or TLS certificates, which are associated with the authorization certificate.

Embodiments of the invention are particularly advantageous because the at least one attribute is read from a particularly trustworthy ID token, for example an official document. It is further particularly advantageous that no central storage of the attributes is required. Embodiments of the invention thus allows a particularly high degree of trustworthiness regarding the communication of the attributes that belong to a digital identity, combined with optimal data protection and extremely convenient handling.

According to one embodiment of the invention, the first and second cryptographically secure connections are in each case transport layer connections. The first and second connections are, for example, Transport Layer Security (TLS) and Secure Sockets Layer (SSL) connections, respectively. In contrast, the third connection having end-to-end encryption between the ID token and the ID provider computer system is established on a higher layer, such as an application layer.

According to one embodiment of the invention, the service computer system generates a Security Assertion Markup Language (SAML) object, which includes the attribute specification of the attributes to be read from the ID token and the signature of the service computer system. The SAML object is transmitted to the ID provider computer system. The ID provider computer system includes a SAML logic component, which is to say a computer program for receiving and processing SAML objects.

According to one embodiment of the invention, the ID provider computer system transmits the at least one attribute in form of a SAML object to the service computer system after the ID provider computer system has read the at least one attribute from the ID token and stored the read attributes in the SAML object, which initially is received from the service computer system.

According to one embodiment of the invention, the soft token is generated by the service computer system by way of a blind signature or as a U-Prove token.

According to one embodiment of the invention, it is possible to generate multiple soft tokens for the same secure element. For this purpose, a separate asymmetric cryptographic key pair is associated with each soft token. The secret key of this additional key pair can be stored together with the public key pair of the first key pair in encrypted form, for example in a memory of the electronic device. For example, the ciphertext of the secret key can be stored in the file system of the electronic device.

In another aspect, the invention relates to a computer program product, in particular a digital storage medium, on which executable program instructions for carrying out a method according to the invention are stored.

In another aspect, the invention relates to a service computer system and to a data processing system, which comprises at least one such service computer system and an ID provider computer system. The individual functional components of these computer systems can be implemented on the same or different hardware units, which can be linked to each other, for example. The data processing system can also include the secure element and/or the ID token, the electronic device and/or the user computer system.

Embodiments of the invention will be described in more detail hereafter with reference to the drawings. In the drawings.

Elements of the following embodiments that correspond to each other are denoted by the same reference numerals.

Figure 1:
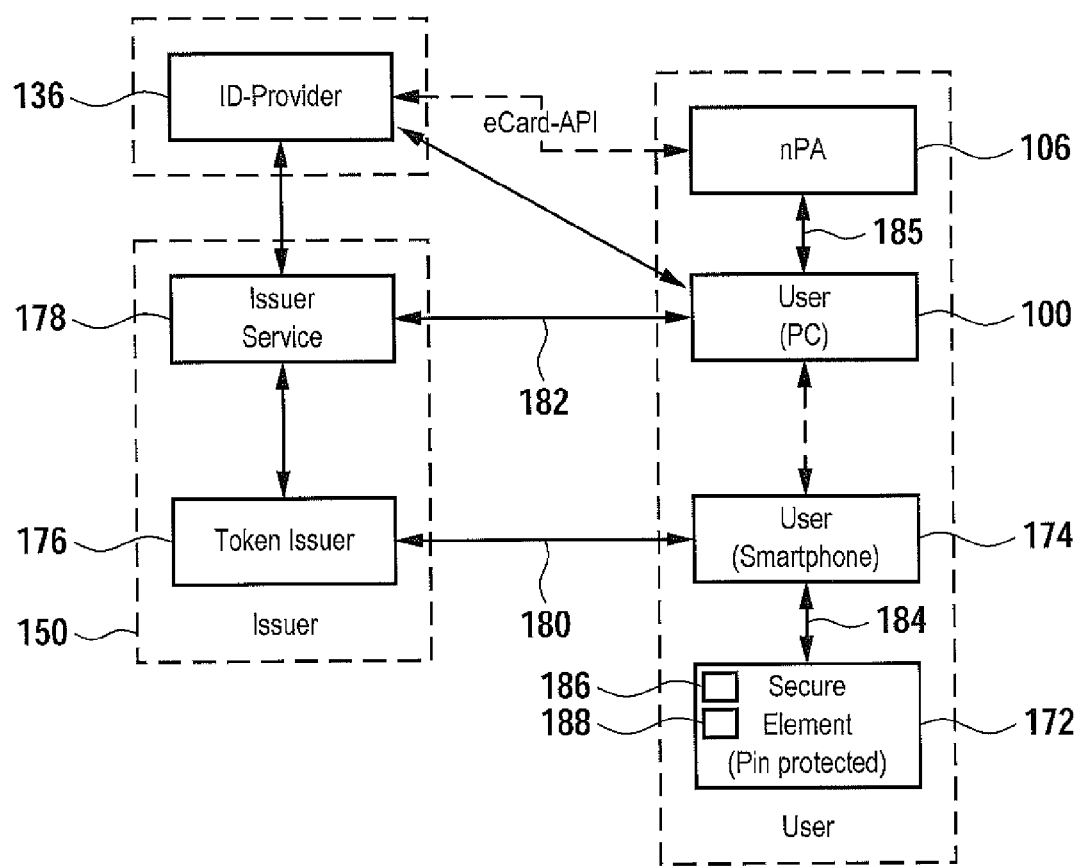
FIG. 1 shows a block diagram of a first embodiment of a data processing system according to the invention.

FIG. 1 shows a data processing system comprising a user computer system 100 and an ID token 106, such as an electronic identification document, of the same user. An ID provider computer system 136 is used to read at least one attribute that is stored in the ID token. For example, the ID provider computer system 136 can implement the eCard-API-Framework as is specified by the German Federal Office for Security in Information Technology in Technical Directive TR-03112.

A service computer system 150 is used to generate a soft token for the user. This soft token should be cryptographically tied to a secure element 172 of the same user. The exchange of data between the service computer system 150 and the secure element 172 can take place via an electronic device 174 of the user.

This electronic device can be a separate mobile terminal, such as a mobile telephone, in particular a smart phone. In particular if the electronic device 174 is designed as a smart phone, this can also perform the function of the user computer system 100, so that a separate user computer system 100 is not required. The functionalities of the user computer system 100 and of the electronic device 174 are then instead performed by one and the same device of the user.

The service computer system 150 can comprise a first program component 176, which includes a password generator, for example, for generating a one-time password and is used to generate the soft token. The service computer system 150 can comprise a second program component 178, which is used in particular to receive the one-time password from the user and to communicate with the ID provider computer system 136.

The service computer system 150 can establish a first cryptographically secure connection 180 to the electronic device 174 and a second cryptographically secure connection 182 to the user computer system 100, such as between the program component 176 and the electronic device 174 or between the program component 178 and the user computer system 100.

The communication between the electronic device 174 and the secure element 172 takes place via a local connection 184, such as via a chip card interface of the electronic device 174; the communication between the user computer system and the ID token 106 likewise takes place via such a local connection 185.

The secure element 172 includes a protected memory area 186, in which a secret key of a first asymmetric cryptographic key pair can be stored, which is associated with the secure element 172. The associated public key of the first key pair can be stored in a readily readable memory area 188 of the secure element 172.

So as to generate a soft token that is cryptographically tied to the secure element 172 with the aid of ID token 106, the following procedure can be used:

The connections 180 and 182 are established. The user enters his request for the generation of the soft token, so that this request is transmitted via the connection 180 to the service computer system 150, for example to the program component 176. Thereafter, a one-time password is generated by the service computer system 150, this password being transmitted to the user via the same connection 180 via which the request was received. The user must then enter this one-time password, so that it is transmitted via the other connection, which is to say the connection 182, back to the service computer system. When the one-time password that was generated by the service computer system 150 and the one that was received, or an identifier derived therefrom on the user side, agree with each other, it is ensured that the two connections 180 and 182 exist to one and the same user.

The service computer system 150 then generates an attribute specification, in which it is specified which attributes are to be read from the ID token 106. This attribute specification is sent from the service computer system 150 to the ID provider computer system 136, which thereupon reads the specified attributes from the ID token 106 in the manner that is known per se. This can be done according to the eCard-API-Framework, for example.

The ID provider computer system 136 then responds to the attribute specification of the service computer system 150 with the read-out attributes, which together with the public key of the secure element 172 are included in the generation of the soft token by the service computer system 150. This soft token is then transmitted from the service computer system via one of the connections 180 or 182 to the user.

For example, the generation of the soft token can take place according to the U-Prove standard. In this case, the service computer system 150 acts as the issuer, wherein the actual generation of the U-Prove token is carried out by the program component 176. An issuer service is made available by the program component 178, for example in form of a website in which the user can enter the one-time password.

It is particularly advantageous here that intermediate storage of the soft token is not required, which increases the security of the system. When the U-Prove standard is used, a specific additional advantage is that the user himself can specify which data he or she wants to divulge, and that the creation of a profile, such as about the buying pattern of the user, can be avoided.

Figure 2:
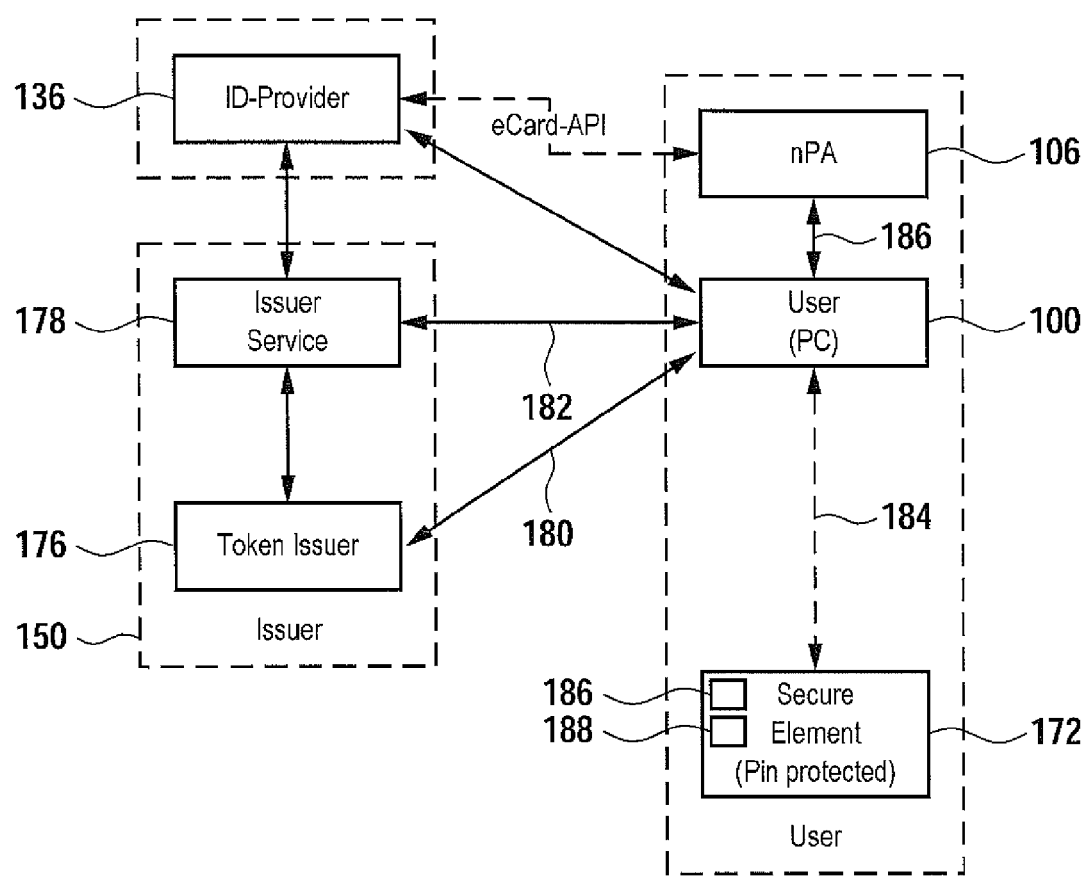
FIG. 2 shows a block diagram of a second embodiment of a data processing system according to the invention.

FIG. 2 shows a further embodiment of a data processing system according to the invention, wherein here the user computer system 100 also performs the functionality of the electronic device 174. Both connections 180 and 182 are thus established to the user computer system 100, such as in two different sessions that take place simultaneously. Similarly, it is also possible for the functionality of the user computer system 100 to be performed by the electronic device 174, in particular if this involves what is known as a smart phone.

Figure 3:
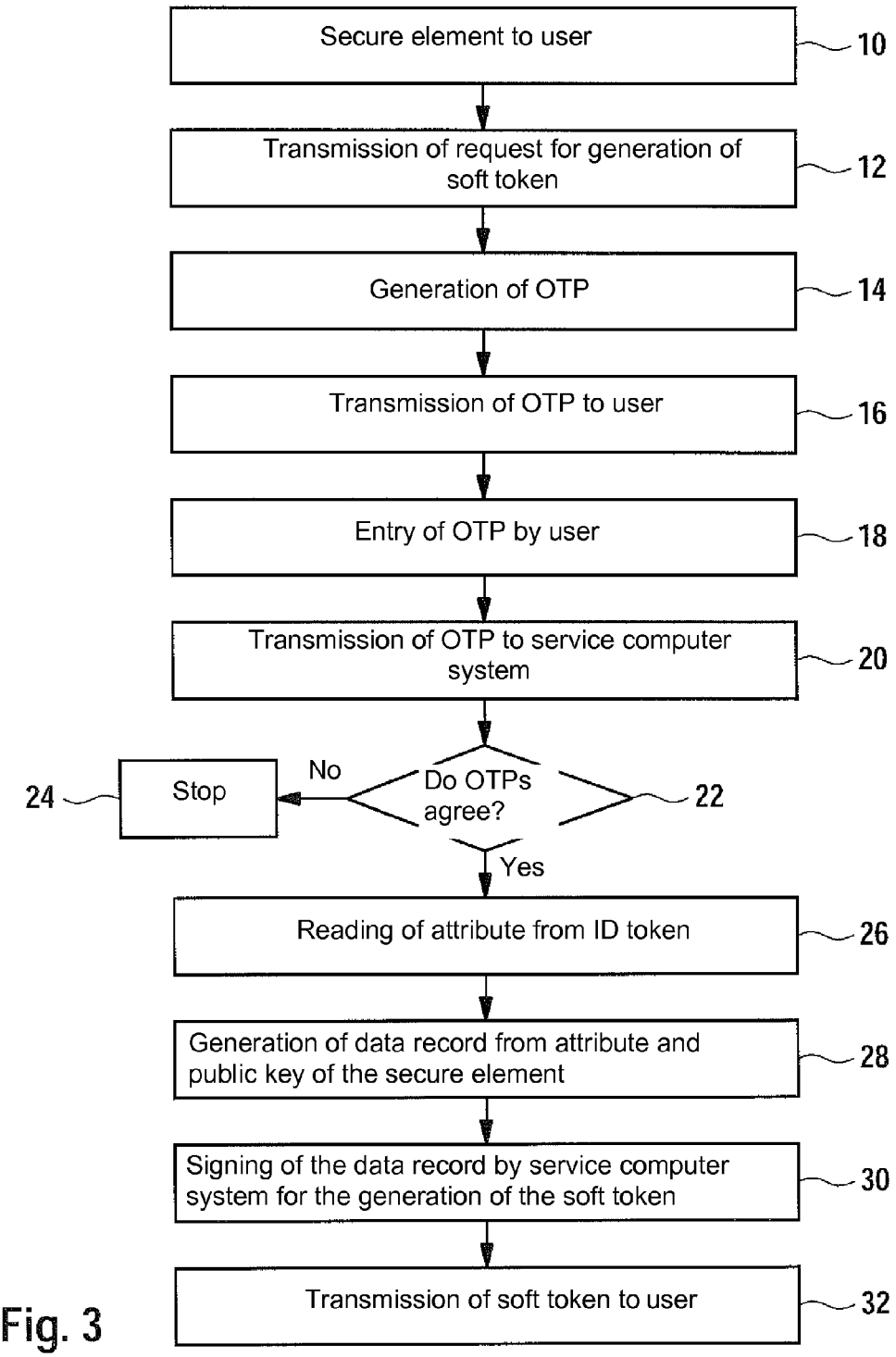
FIG. 3 shows a flow chart of one embodiment of a method according to the invention.

FIG. 3 shows a flow chart of one embodiment of a method according to the invention.

In step 10, a secure element is made available to the user. For example, the user can readily acquire a secure element, which has not been personalized to the user. So as to generate a soft token, in particular a U-Prove token, which is to be tied to the secure element, the procedure is as follows:

In step 12, a request for the generation of the soft token is transmitted from the user to the service computer system, which thereupon generates a one-time password in step 14. This one-time password is transmitted in step 16 from the service computer system to the user, and more particularly via a first cryptographically secure connection. The user must then enter this received one-time password in step 18, so that the one-time password, or an identifier derived therefrom according to a predetermined algorithm, is transmitted from the user to the service computer system, and more particularly via a second cryptographically secure connection (step 20). The service computer system then checks in step 22 whether the generated one-time password agrees with the received one-time password or the identifier derived therefrom. If this is not the case, the process is aborted in step 24.

In the opposite case, in step 26 one or more attributes are then read from the ID token of the user so as to generate therefrom, in step 28, a data record that also includes the public key of the secure element, which has been made available to the user in step 10.

In step 30, this data record is signed by the service computer system so as to thereby generate the soft token. In step 32, the soft token is transmitted to the user, and more particularly via the first and/or the second connection.

Figure 4:
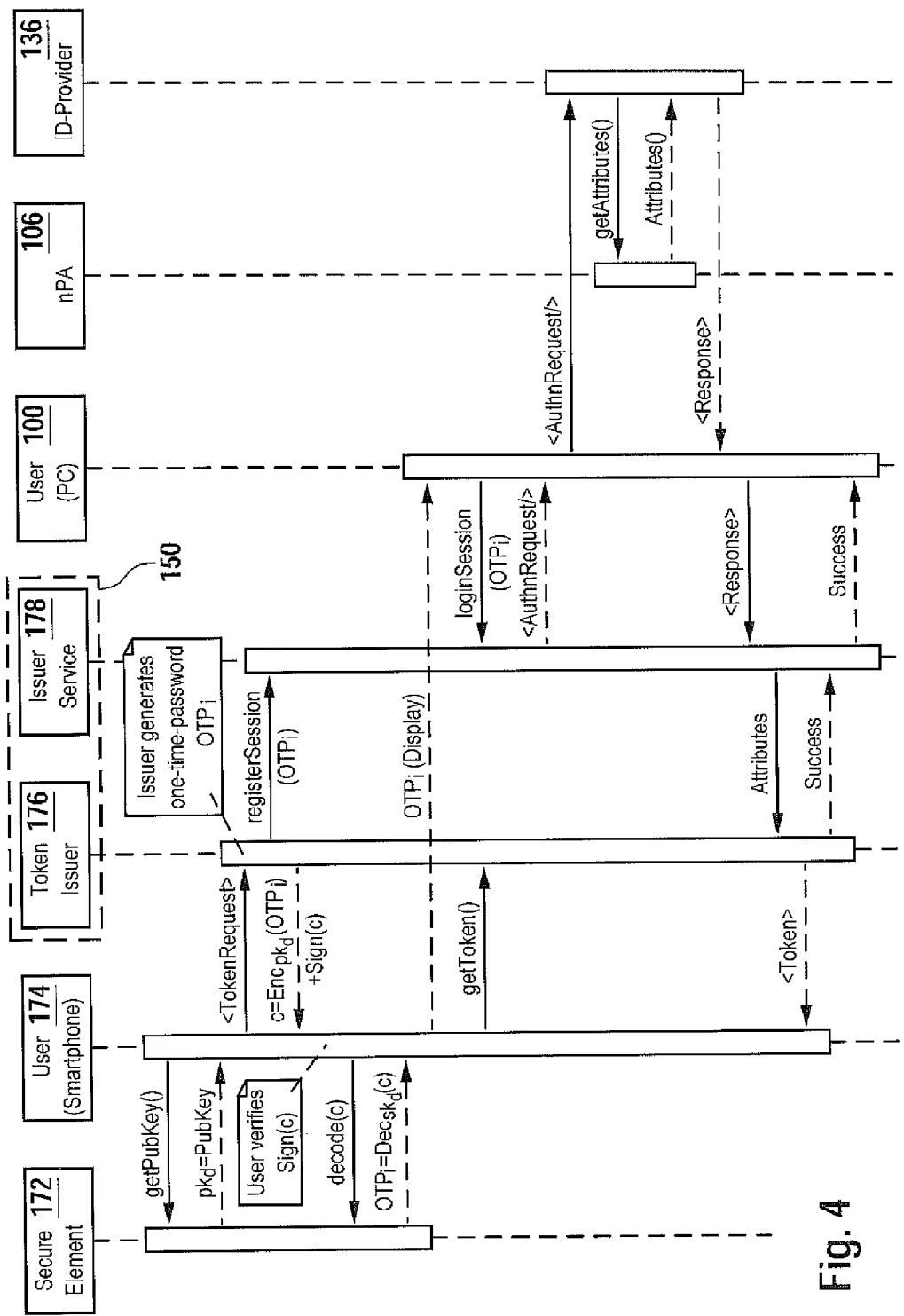
FIG. 4 shows a UML chart of a further embodiment of a method according to the invention.

FIG. 4 shows a further embodiment of a method according to the invention based on a UML diagram.

The user enters a request for the public key of the secure element 172 into his electronic device 174, the key being stored in the readily readable memory area 188 of the secure element 172 (see FIG. 1). This request "getPubKey( )" is transmitted from the electronic device 174 via the local connection 184 to the secure element 172.

The secure element 172 thereupon reads the public key of the first cryptographic key pair associated with the element from the memory area 188 and sends this public key $pk_d$ via the local connection 184 to the electronic device 174.

The connection 180 via which the request for the soft token is transmitted from the electronic device 174 to the program component 176 is established between the electronic device 174 and the service computer system 150, which is to say the program component 176 here. The public key, which was previously read from the secure element 172, is also transmitted via this cryptographically secure connection 180 from the electronic device 174 to the program component 176.

The program component 176 thereupon generates a one-time password $OTP_i$ for this request that was received via the connection 180. This $OTP_i$ is transmitted from the program component 176 to the program component 178 and is recorded by this program component 178, which is to say is temporarily stored—"registerSession ($OTP_i$)".

Moreover, the $OTP_i$ is encrypted by the program component 176 with the aid of the public key $pk_d$, resulting in the ciphertext c. The ciphertext c is further digitally signed by the program component 176. The ciphertext c and its signature Sign(c) are transmitted via the secure connection 180 to the electronic device 175.

The electronic device 174 then verifies the signature of the ciphertext c. If the signature of the ciphertext c is valid, the electronic device 174 directs a request for the decoding of the ciphertext c to the secure element 172, which is to say the request "decode (c)." With the aid of the secret key stored in the protected memory area 186, the secure element 172 then decrypts c and sends the result of this decryption operation, which is to say $OTP_i$, via the local connection 184 to the electronic device 174.

The electronic device 174 thereupon displays $OTP_i$ on its display and further directs a request "getToken( )" to the program component 176 so as to request the generation of the soft token. The user can read the $OTP_i$ from the display of the electronic device 174 and enter it into the user computer system 100.

Instead of manual input, the $OTP_i$ can be electronically captured by the user computer system 100 from the display of the electronic device 174. For example, the $OTP_i$ is displayed on the display of the electronic device 174 in the form of a machine-readable optical patterns, such as in the form of a QR code. This machine-readable optical pattern is captured with the aid of a digital camera of the user computer system 100 by taking a digital photo and is automatically decoded so as to enter the $OTP_i$ in the user computer system in this way. The digital camera can be connected to the user computer system or it can be an integral part of the user computer system 100. For example, the user computer system 100 can be a laptop computer having a webcam integrated into the housing.

The $OTP_i$ is transmitted via the secure connection 182 established between the user computer system 100 and the program component 178. For example, the program component 178 generates a website, which is displayed on the user computer system 100 and in which the user enters the $OTP_i$ so as to perform a "login."

The program component 178 thereupon compares the previously temporarily stored $OTP_i$ to the $OTP_i$ that was received from the user computer system 100 via the connection 182. If an agreement exists, the program component 178 then directs an authentication request "AuthnRequest/" to the ID provider computer system 136, which is conducted to the ID provider computer system 136 via the connection 182 by way of a redirect of the user computer system 100. This authentication request can include an attribute specification, which specifies those attributes that are to be read from the ID token 106 so as to be included in the soft token. This can be done in the form of a SAML object.

The ID provider computer system directs a command for the reading of the specified attributes "get attributes ( )" to the ID token 106 and thereupon receives these attributes, if the ID provider computer system 136 can furnish proof of the necessary read rights. The attributes read out by the ID provider computer system 136 are then signed and forwarded, for example in the form of a SAML object, to the program component 178 via the user computer system 100. The program component 178 passes the attributes thus received on to the program component 176 internally in the service computer system 150. The program component 176 thereupon generates a data record, which includes the received attributes and the public keys of the secure element 172 read from the memory area 188, and signs these digitally. The result is the requested soft token, which is then transmitted to the electronic device 174, for example via the connection 180.

Accordingly, further soft tokens that include different attributes in each case can be generated for the secure element 172. For this purpose, the procedure can be such that a further cryptographic key pair is generated for each of the soft tokens, for example by the electronic device 174, wherein the secret key of such a further key pair is encrypted with the aid of the public key of the secure element 172 which has been read from the memory 188, so as to store the ciphertext of the secret key, for example in a file system of the electronic device 174. Upon a presentation of the further soft token, this ciphertext of the secret key is then decrypted by the secure element 172 by transmission of the ciphertext to the secure element 172 via the local connection 184.

Figure 5:
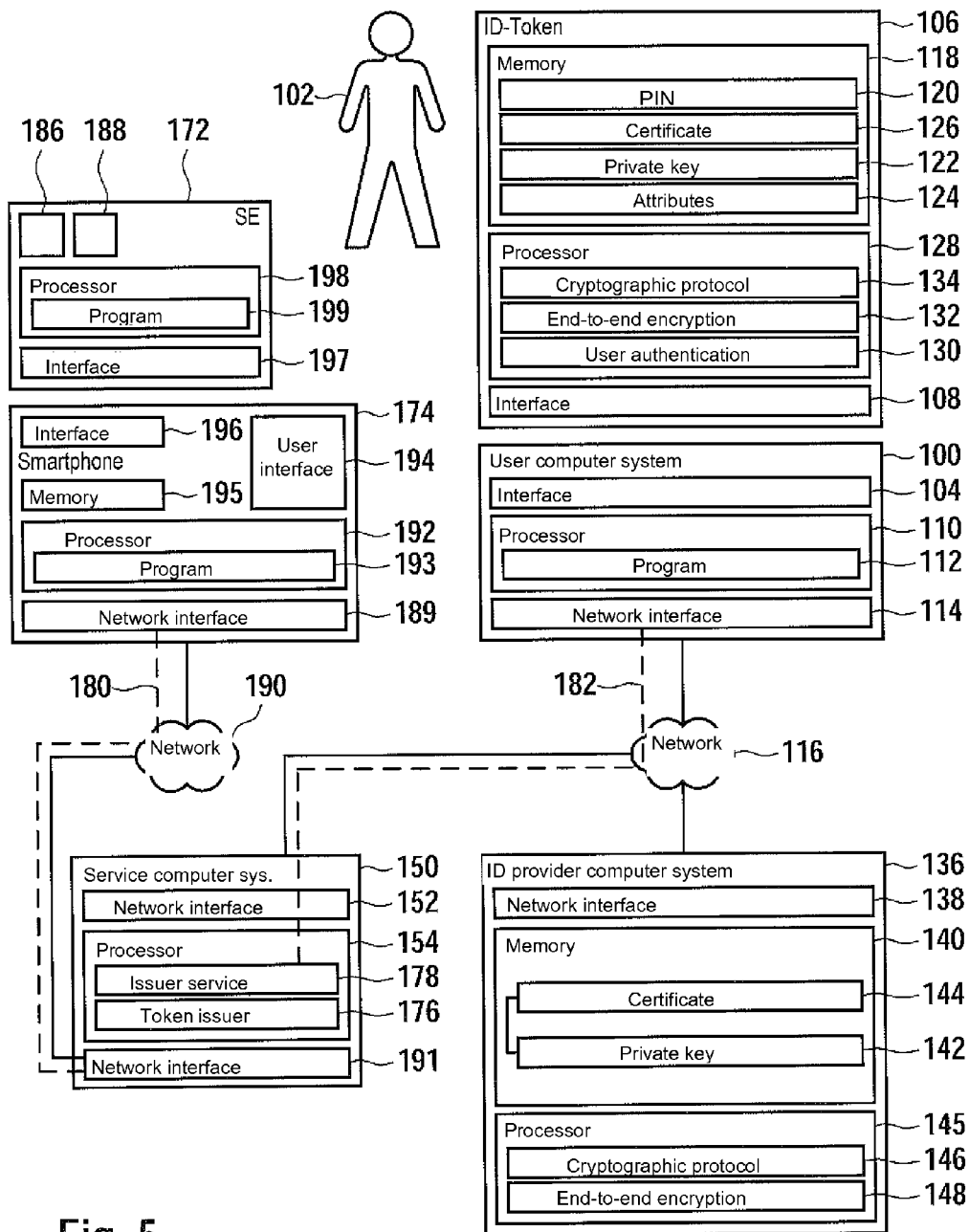
FIG. 5 shows a block diagram of a further embodiment of a data processing system according to the invention.

FIG. 5 shows a block diagram of a further embodiment of a data processing system according to the invention.

The program instructions 156 can include the program components 176 and 178 in the embodiment described here.

Here, the electronic device 174 is designed, for example, as a mobile communication device, in particular as a smart phone, and has a network interface 189 to a mobile communication network 190, which operates according to the GSM or UMTS standard, for example. The service computer system 150 comprises a corresponding network interface 191 to the mobile communication network 190, so that the connection 180 can be established via the mobile communication network 190.

The electronic device 174 further comprises a processor 192 for executing program instructions 193 and a user interface 194, which includes a display and a keyboard or a touch screen, for example. The electronic device 174 further comprises an electronic memory 195 and an interface 196 for establishing the local connection 184 to the secure element 172, which comprises a corresponding interface 197. The secure element 172 further comprises a processor 198 for executing program instructions 199. So as to use the service computer system 150, which is to say for generating a soft token, the procedure is as described in the embodiments of FIGS. 1 to 4.

For example, the user 102 enters a request for the generation of the soft token via the user interface 194 of the electronic device 174, whereupon initially the public key is read from the memory area 188 via the local connection 184. By way of execution of the program instructions 193, the "TokenRequest" is then transmitted together with this public key via the connection 180 to the program component 176, which thereupon generates the $OTP_i$, encrypts it with the public key, and sends the signed ciphertext c to the electronic device 174 via the connection 180.

By way of execution of the program instructions 193, the signature of c is verified, and then the command "decode(c)" is sent to the secure element 172 via the local connection 184. The element responds with the decrypted $OTP_i$, which is then displayed on the user interface 194 by way of execution of the program instructions 193.

The user 102 can then bring up the website of the program component 178, for which purpose the connection 182 between the program component 178 and the user computer system 100 is established via the network 116. The user 102 reads the $OTP_i$ from the display of the user interface 194 and enters this $OTP_i$ into the website of the program component 178 via the keyboard of the user computer system 100. If the generated $OTP_i$ and the $OTP_i$ thus received agree with each other, the program component 178 generates the authentication request "AuthnRequest" (see FIG. 4). In the embodiment described here, this triggers the following sequence of steps so as to read the at least one attribute from the ID token 106.

1. Authentication of the user 102 with respect to the ID token 106.

The user 102 must authenticate himself with respect to the ID token 106. In the case of an implementation using a PIN, the user 102 enters his PIN, for example via the user computer system 100 or a chip card terminal connected thereto. By way of execution of the program instructions 130, the ID token 106 then checks the accuracy of the entered PIN. If the entered PIN matches the reference value of the PIN that is stored in the protected memory area 120, the user 102 is considered to be authenticated. A similar procedure can be employed when a biometric feature of the user 102 is used so as to authenticate the same, as described above.

2. Authentication of the ID provider computer system 136 with respect to the ID token 106.

For this purpose, a third connection is established between the ID token 106 and the ID provider computer system 136 via the user computer system 100 and the network 116. For example, the ID provider computer system 136 transmits its certificate 144 via this third connection to the ID token 106. By way of the program instructions 134, a so-called challenge is then generated, which is to say a random number, for example. This random number is encrypted with the public key of the ID provider computer system 136 that is included in the certificate 144. The resulting ciphertext is sent from the ID token 106 via the third connection to the ID provider computer system 136. The ID provider computer 136 decrypts the ciphertext using the private key 142 of the system and thus obtains the random number. The ID provider computer system 136 sends the random number back to the ID token 106 via the third connection. By way of execution of the program instructions 134, it is checked there whether the random number received from the ID provider computer system 136 matches the originally generated random number, which is to say the challenge. If this is the case, the ID provider computer system 136 is considered to be authenticated with respect to the ID token 106. The random number can be used as a symmetric key for the end-to-end encryption.

3. After the user 102 has successfully authenticated himself with respect to the ID token 106, and after the ID provider computer system 136 has successfully authenticated itself with respect to the ID token 106, the ID provider computer system 136 receives a read authorization for reading one, more or all attributes stored in the protected memory area 124. The scope of the read rights can be specified in the certificate 144 of the ID provider computer system 136. Based on a corresponding read command, which the ID provider computer system 136 sends via the third connection to the ID token 106, the requested attributes are read from the protected memory area 124 and encrypted by way of execution of the program instructions 132. The encrypted attributes are transmitted to the ID provider computer system 136 via the third connection, where they are decrypted by way of execution of the program instructions 148. The ID provider computer system 136 thus gains knowledge of the attributes read from the ID token 106.

The ID provider computer system signs these attributes with the aid of the system certificate 144, and the attributes are transmitted via the user computer system 100 or directly to the service computer system 150. The service computer system 150 thus gains knowledge about the attributes that are read from the ID token 106, so that the service computer system 150 can generate the soft token with the aid of these attributes.

Because of the need of the authentication of the user 102 with respect to the ID token 106 and of the authentication of the ID provider computer system 136 with respect to the ID token 106, the required trust anchor is created, so that the service computer system 150 can be certain that the attributes of the user 102 communicated by the ID provider computer system 136 are accurate and not forged.

Depending on the embodiment, the sequence of the authentication may be different. It is possible, for example, for the user 102 to first have to authenticate himself with respect to the ID token 106 and thereafter the ID provider computer system 136. However, in general it is also possible for the ID provider computer system 136 to first have to authenticate itself with respect to the ID token 106 and only then for the user 102 to have to do so.

In the first case, the ID token 106 is, for example, designed so that it is enabled only when a correct PIN or a correct biometric feature is entered by the user 102. Only this enabling allows the program instructions 132 and 134 to be started, and thus the authentication of the ID provider computer system 136.

In the second case, the program instructions 132 and 134 can already be started even if the user 102 has not authenticated himself with respect to the ID token 106. In this case, the program instructions 134, for example, are designed so that the ID provider computer system 136 can issue a read access to the protected memory area 124 for reading one or more of the attributes only after the program instructions 130 have signaled the successful authentication of the user 102 as well.

It is particularly advantageous to be able to utilize the ID token 106 for e-commerce and e-government applications, for example, and more specifically without media breaches and with legal certainty, because of the trust anchor created by the need for the user 102 to authenticate himself and the need for the ID provider computer system 136 to authenticate itself with respect to the ID token 106. It is also particularly advantageous that no central storage of the attributes of different users 102 is required, whereby the data protection problems that exist in the prior art are hereby solved. As far as the convenience of the use of the method is concerned, it is particularly advantageous that no prior registration of the user 102 is required to be able to utilize the ID provider computer system 136.

Figure 6:
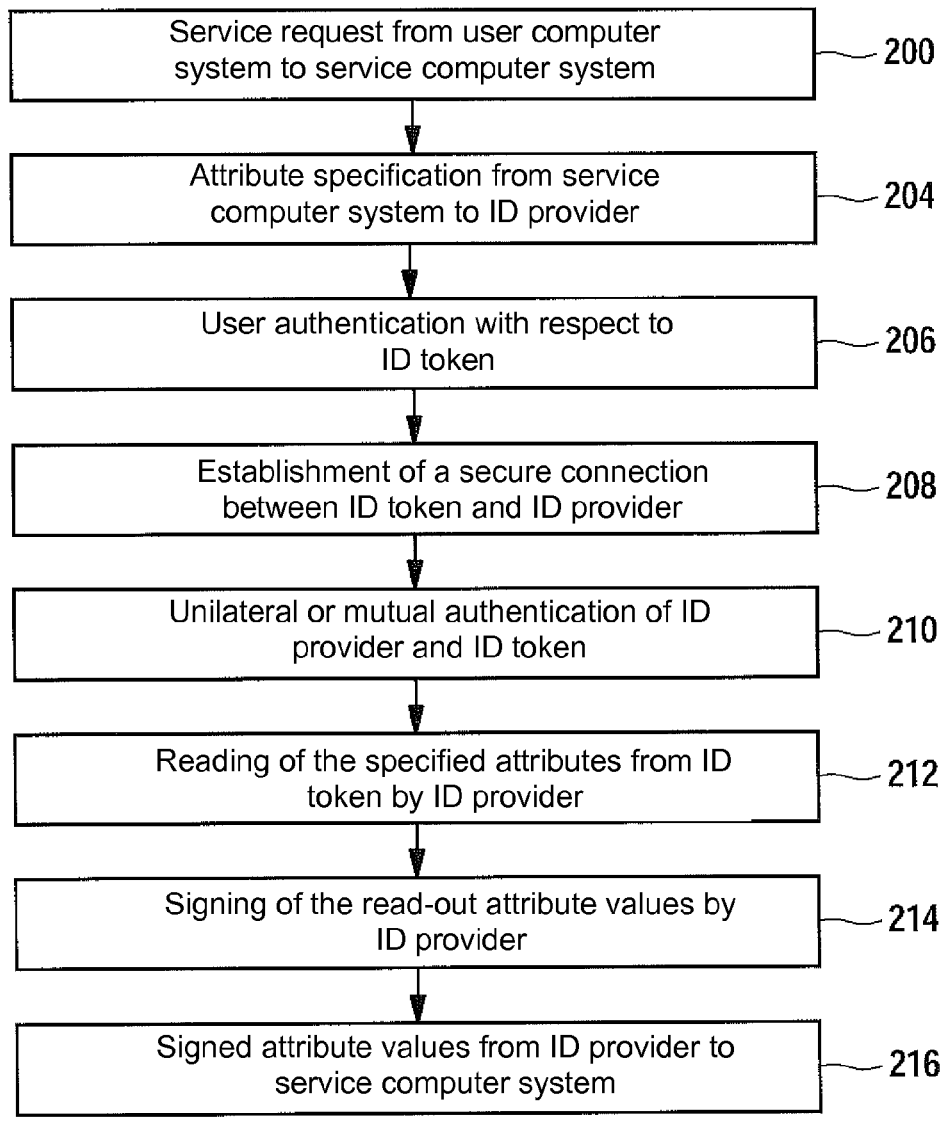
FIG. 6 shows a flow chart of a method for reading the at least one attribute from the ID token.

FIG. 6 shows a corresponding method for reading the at least one attribute. In step 200, a service request for the generation of the soft token is sent from the user computer system to the service computer system. For this purpose, the user opens, for example, an Internet browser of the user computer system and enters a URL to bring up a website of the service computer system. The user then enters his service request on the accessed website, where he or she can specify the attributes to be read. The attribute specification can also be predetermined as being fixed.

In step 204, the attribute specification is transmitted from the service computer system to the ID provider computer system, and more particularly either directly or via the user computer system.

So as to give the ID provider computer system the option to read attributes from the ID token, the user authenticates himself with respect to the ID token in step 206.

In step 208, a connection is established between the ID token and the ID provider computer system. This is preferably a secure connection, for example according to what is known as a Secure Messaging method.

In step 210, at least one authentication of the ID provider computer system with respect to the ID token via the connection established in step 208 takes place. In addition, an authentication of the ID token with respect to the ID provider computer system may be provided for.

After both the user and the ID provider computer system have been successfully authenticated with respect to the ID token, the ID provider computer system receives the access authorization for reading the attributes from the ID token. In step 212, the ID provider computer system sends one or more read commands for the reading of the attributes that are required according to the attribute specification from the ID token. The attributes are then transmitted to the ID provider computer system via the secure connection using end-to-end encryption, where they are decrypted.

The read-out attribute values are signed by the ID provider computer system in step 214. In step 216, the ID provider computer system sends the signed attribute values via the network. The signed attribute values reach the service computer system either directly or via the user computer system. In the latter case, the user can have the option to acknowledge the signed attribute values and/or supplement them with additional data. It may be provided that the signed attribute values, optionally together with the supplemented data, are forwarded from the user computer system to the service computer system only after the release has been given by the user. This establishes the greatest possible transparency for the user with regard to the attributes sent from the ID provider computer system to the service computer system.

For example, the soft token can be stored in the memory 195 of the electronic device 174 and/or in the memory area 188 of the secure element 172.

So as to authenticate the user 102, for example for e-government, e-commerce or m-commerce applications or for the purposes of controlling access, for example to a building, the user 102 can now use the secure element 172 in combination with the soft token, wherein a particular degree of security is provided because the soft token is cryptographically tied to the secure element 172.

Figure 7B:
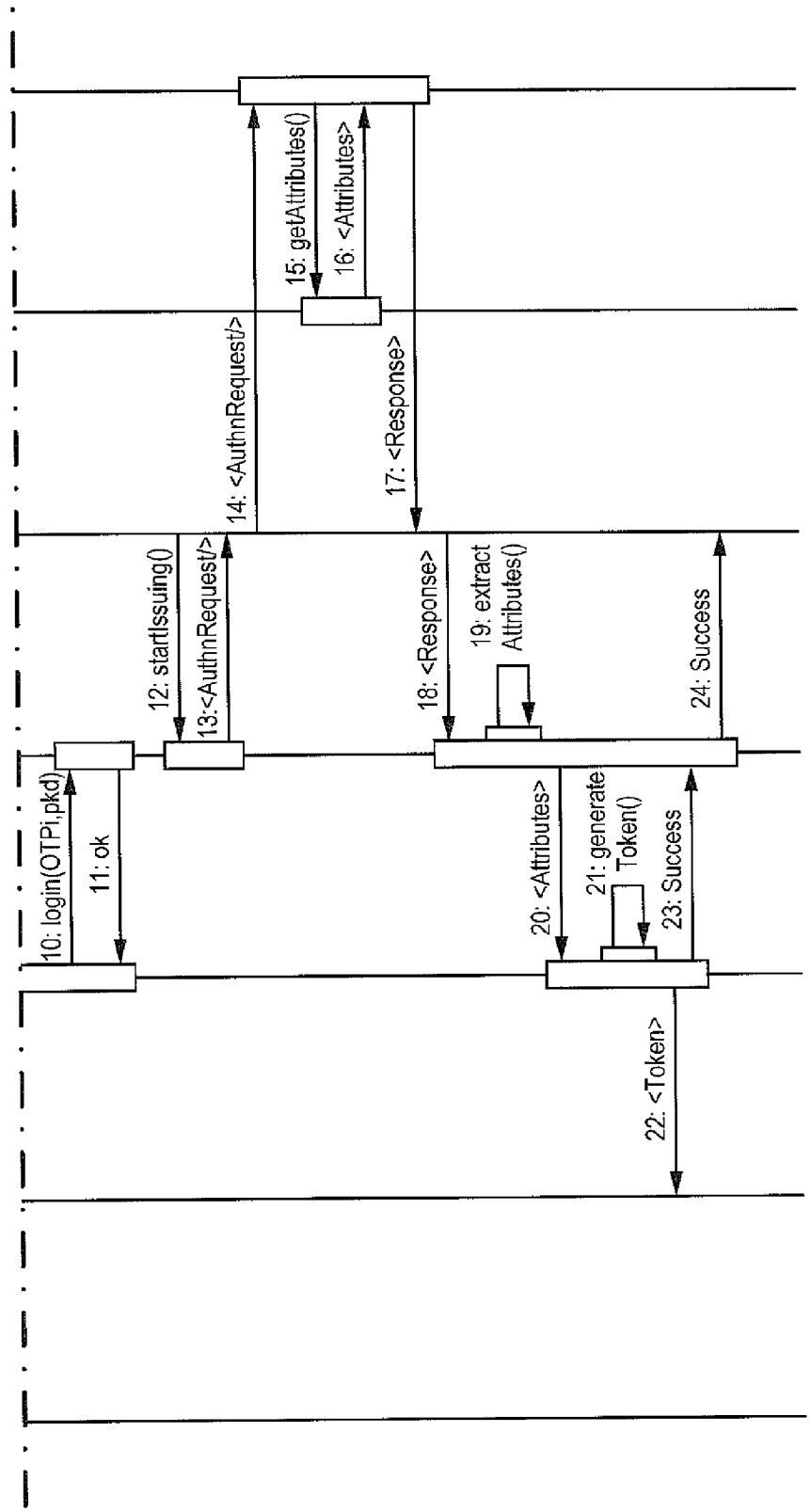
FIG. 7 shows a UML chart of a further embodiment of a method according to the invention.

FIG. 7 shows a further embodiment of the invention, which is similar to the embodiment according to FIG. 4, wherein here the carrying out of the method is initiated with the aid of the user computer system 100. In step 1, a request for the generation of the soft token, which is to say initially for the generation of a one-time password for establishing the necessary session, is entered into the service computer system 150, which is to say the program component 178 here, with the aid of the user computer system 100. This is denoted by "getOTP( )" in FIG. 7. The request can be entered into the service computer system 150, for example, by bringing up a website of the service computer system 150 with the aid of the user computer system 100, the corresponding request of the user being entered on this website via the browser of the user computer system 100. For example, for this purpose initially the first cryptographically secure connection 180 is established, and more particularly in the embodiment described here between the user computer system 100 and the service computer system 150, so as to transmit getOTP( ) via this connection 180.

In step 2, the service computer system 150 generates the requested one-time password $OTP_i$. The corresponding one-time password generator can be included in the program component 178 here. Thereafter, in step 3, the $OTP_i$ is stored as an identifier of the first cryptographically secure connection 180 that is established between the user computer system 100 and the service computer system 150, which is to say the $OTP_i$ is recorded for the establishment of a session. In step 4, the $OTP_i$ is then transmitted via the first cryptographically secure connection 180 from the service computer system 150 to the user computer system 100, for example in the form of a QR code.

After the QR code has been received, this code is displayed on the display of the user computer system 100. The user can then use his electronic device 174 to electronically capture the QR code displayed on the display of the user computer system 100. For this purpose, an optical scanner that is integrated into the electronic device 174, or a digital camera, may be used. The electronic device 174 is particularly preferably a mobile telephone here, in particular a smart phone, having an integrated digital camera, which is to say a so-called photo cell phone. In this case, the user can photograph the QR code that is displayed on the display of the user computer system 100 using the photo cell phone.

The QR code, which is optically captured with the aid of the electronic device 174, can be decoded by the electronic device 174 by way of execution of a corresponding program module, so as to enter the $OTP_i$ in the electronic device 174 in this way (step 5).

In step 6, the electronic device 174 then requests the public key from the secure element 172 and receives this public key in step 7, similarly to the two first steps shown in FIG. 4. The $OTP_i$ is further transmitted from the electronic device 174 to the secure element 172. The secure element 172 generates a signature s of the $OTP_i$ and passes this signature s on to the electronic device 174.

In step 8, the second cryptographically secure connection 182 between the electronic device 174 and the service computer system 150 is established. In step 8, a signal is also sent from the electronic device 174 to the service computer program 150, which is to say the first program component 176 here, via the connection 182 so as to transmit a command getToken($OTP_i$,pkd,s). With this signal, the generation of the soft token is requested, wherein the $OTP_i$, the public key of the secure element 172 pkd and the signature s are transmitted together with this request.

In step 9, the signature s is verified by the program component 176 with the aid of the public key pkd. If the verification is successful, in step 10 the $OTP_i$, and preferably also the public key pkd, are transmitted from the program component 176 to the program component 178 and compared by the program component 178 to the recorded $OTP_i$. Moreover, the public key pkd is stored in the service computer system 150, which is to say by the program component 178 for example, so as to be able to use the same subsequently in step 21 for the generation of the soft token. For example, the public key pkd is stored together with the $OTP_i$ as an identifier so as to associate the public key pkd with the session.

If the $OTP_i$ that is sent from the electronic device 174 to the service computer system 150 via the second connection and entered into the program component 178 in step 10 agrees with the previously recorded $OTP_i$, the session has been successfully established, and the subsequent read access to the ID token 106 can be carried out. For this purpose, it may be necessary for the user to enter a corresponding confirmation into the service computer system in step 12. The subsequent steps 13 to 18 are similar to the corresponding steps of FIG. 4.

In step 19, the attributes are read from the response of the ID provider computer system 136 by the program component 178 and passed on to the program component 176 in step 20. With the aid of these attributes and the public key pkd received in step 8, the program component 176 then generates the soft token and in step 22 transmits the soft token to the electronic device 174, for example via the second connection. In steps 23 and 24, the user computer system 100 is notified regarding the successful generation of the soft token.

Some aspects and features of the disclosed embodiments are set out in the following numbered items:

1. A method for generating a soft token, comprising:
   making a secure element (172) available, wherein a secret key of a first asymmetric cryptographic key pair is stored in a protected memory area (186) of the secure element;
   establishing a first cryptographically secure connection (180) between an electronic device (174; 100) and a service computer system (150);
   transmitting a request for the generation of a soft token from the electronic device to the service computer system via the first connection;
   generating, by the service computer system, a one-time password after having received the request;
   recording, by the service computer system, the one-time password as an identifier of the first connection;
   transmitting the one-time password from the service computer system to the electronic device via the first connection;
   outputting the one-time password via a user interface (194) of the electronic device;
   establishing a second cryptographically secure connection (182) between a user computer system (100; 174) and the service computer system;
   entering the one-time password into the user computer system;
   transmitting the entered one-time password from the user computer system to the service computer system via the second connection; and
   checking, by the service computer system, whether the recorded one-time password agrees with the one-time password received via the second connection, and only if this is the case reading at least one attribute stored in an ID token (106), generating the soft token by signing the at least one attribute and the public key of the first cryptographic key pair, transmitting the soft token to the electronic device via the first connection and/or transmitting the soft token to the user computer system via the second connection.

2. The method according to item 1, wherein a public key of the first key pair is stored in a readily readable memory area (188) of the secure element, further comprising:
  transmitting the public key from the secure element to the electronic device via a local connection (184);
  transmitting the public key from the electronic device to the service computer system via the first cryptographically secure connection;
  encrypting, by the service computer system, the one-time password with the public key, wherein the encrypted one-time password is transmitted from the service computer system to the electronic device via the first connection;
  transmitting the encrypted one-time password from the electronic device to the secure element via the local connection;
  decrypting, by the secure element, the one-time password with the secret key of the first key pair; and
  transmitting the decrypted one-time password from the secure element to the electronic device via the local connection for output by the electronic device.

3. The method according to item 1 or 2, wherein the service computer system comprises a first program component (176) for generating the one-time password, for encrypting the one-time password, and for generating the soft token, and a second program component (178) for receiving the one-time password from the user computer system, the first connection being established between the electronic device and the first program component, and the second connection being established between the user computer system and the second program component, the method further comprising:
  transmitting the one-time password from the first program component to the second program component, the second program component checking whether the one-time password received from the first program component agrees with the one-time password received from the user computer system via the second connection;
  receiving, by the second program component, the at least one attribute that is read from the ID token; and
  transmitting the at least one attribute from the second program component to the first program component.

4. The method according to item 1, 2 or 3, wherein the electronic device is a mobile terminal, in particular a mobile communication device, a mobile telephone, a smart phone, a portable computer or another mobile battery-operated terminal having a communication interface for establishing the local connection to the secure element.

5. The method according to item 1, 2 or 3, wherein the user computer system performs the function of the electronic device, or the electronic device performs the function of the user computer system.

6. A method according to any one of the preceding items, wherein reading the at least one attribute from the ID token comprises:
  authenticating the user (102) with respect to the ID token;
  authenticating an ID provider computer system (136) with respect to the ID token; and
  after successful authentication of the user and of the ID provider computer system with respect to the ID token, accessing for reading, by the ID provider computer system, the at least one attribute stored in the ID token via a third connection, and transmitting the at least one attribute from the ID provider computer system to the service computer system, the third connection between the ID token and the ID provider computer system being established via the user computer system using end-to-end encryption.

7. The method according to item 1, wherein the at least one attribute is signed by the ID provider computer system and transmitted to the service computer system via the user computer system.

8. The method according to item 7, wherein the ID provider computer system transmits the at least one attribute in the form of a SAML object to the service computer system.

9. A method according to any one of the preceding items, wherein the soft token is generated by the service computer system by way of a blind signature or as a U-Prove token.

10. A method according to any one of the preceding items, wherein a second asymmetric cryptographic key pair is associated with the soft token, the secret key of the second key pair being encrypted with the public key of the first key pair and stored in a memory (195) of the electronic device.

11. A method according to any one of the preceding items, wherein the ID token is a document comprising an electronic memory (118) that is integrated into the document body, the at least one attribute being stored in the electronic memory.

12. A method according to any one of the preceding items, wherein the electronic device is designed as a computer system (100), in particular as a PC, and the user computer system is designed as a mobile computer (174), in particular as a smart phone, a public key of the first key pair being stored in a readily readable memory area (188) of the secure element, the method further comprising:
  transmitting the public key from the secure element to the mobile computer (174) via a local connection (184); and
  transmitting the public key and the entered one-time password from the mobile computer (174) to the service computer system via the second cryptographically secure connection.

13. A method according to any one of the preceding items, wherein the one-time password is output by displaying a machine-readable optical pattern on a display, and the one-time password is entered by electronically capturing the optical pattern.

14. A computer program product, in particular a digital storage medium, comprising executable program instructions carrying out a method according to any one of the preceding items.

LIST OF REFERENCE NUMERALS

100 user computer system
102 user
104 interface
106 ID token
108 interface
110 processor
112 program instructions
114 network interface
116 network
118 electronic memory
120 protected memory area
122 protected memory area
124 protected memory area
126 memory area
128 processor 130 program instructions
132 program instructions
134 program instructions
136 ID provider computer system
138 network interface
140 memory
142 private key
144 certificate
145 processor
146 program instructions
148 program instructions
149 program instructions
150 service computer system
152 network interface
154 processor
156 program instructions
172 secure element
174 electronic device
176 first program component
178 second program component
180 first cryptographically secure connection
182 second cryptographically secure connection
184 local connection
185 local connection
186 protected memory area
188 readily readable memory area
189 network interface
190 mobile communication network
191 network interface
192 processor
193 program instructions
194 user interface
195 memory
196 interface
197 interface
198 processor
199 program instructions

The invention claimed is:

1. A method for generating a soft token, comprising:
making a secure element available, wherein a secret key of a first asymmetric cryptographic key pair is stored in a protected memory area of the secure element;
establishing a first cryptographically secure connection between an electronic device and a service computer system;
transmitting a request for the generation of a soft token from the electronic device to the service computer system via the first connection;
generating, by the service computer system, a one-time password after having received the request;
recording, by the service computer system, the one-time password as an identifier of the first connection;
transmitting the one-time password from the service computer system to the electronic device via the first connection;
outputting the one-time password via a user interface of the electronic device;
establishing a second cryptographically secure connection between a user computer system and the service computer system;
entering the one-time password into the user computer system;
transmitting the entered one-time password from the user computer system to the service computer system via the second connection; and
checking, by the service computer system, whether the recorded one-time password agrees with the one-time password received via the second connection, and only if this is the case reading at least one attribute stored in an ID token, generating the soft token by signing the at least one attribute and the public key of the first cryptographic key pair, transmitting the soft token to the electronic device via the first connection and/or transmitting the soft token to the user computer system via the second connection.

2. The method according to claim 1, wherein a public key of the first key pair is stored in a readily readable memory area of the secure element, further comprising:
transmitting the public key from the secure element to the electronic device via a local connection;
transmitting the public key from the electronic device to the service computer system via the first cryptographically secure connection;
encrypting, by the service computer system, the one-time password with the public key, wherein the encrypted one-time password is transmitted from the service computer system to the electronic device via the first connection;
transmitting the encrypted one-time password from the electronic device to the secure element via the local connection;
decrypting, by the secure element, the one-time password with the secret key of the first key pair; and
transmitting the decrypted one-time password from the secure element to the electronic device via the local connection for output by the electronic device.

3. The method according to claim 1, wherein the service computer system comprises a first program component for generating the one-time password, for encrypting the one-time password, and for generating the soft token, and a second program component for receiving the one-time password from the user computer system, the first connection being established between the electronic device and the first program component, and the second connection being established between the user computer system and the second program component, the method further comprising:
transmitting the one-time password from the first program component to the second program component, the second program component checking whether the one-time password received from the first program component agrees with the one-time password received from the user computer system via the second connection;
receiving, by the second program component, the at least one attribute that is read from the ID token; and
transmitting the at least one attribute from the second program component to the first program component.

4. The method according to claim 1, wherein the electronic device is a mobile terminal, in particular a mobile communication device, a mobile telephone, a smart phone, a portable computer or another mobile battery-operated terminal having a communication interface for establishing the local connection to the secure element.

5. The method according to claim 1, wherein the user computer system performs the function of the electronic device, or the electronic device performs the function of the user computer system.

6. A method according to claim 1, wherein reading the at least one attribute from the ID token comprises:
authenticating the user to the ID token;
authenticating an ID provider computer system to the ID token; and
after successful authentication of the user and of the ID provider computer system to the ID token, accessing for reading, by the ID provider computer system, the at least one attribute stored in the ID token via a third connection, and transmitting the at least one attribute from the ID provider computer system to the service computer system, the third connection between the ID token and the ID provider computer system being established via the user computer system using end-to-end encryption.

7. The method according to claim 1, wherein the at least one attribute is signed by the ID provider computer system and transmitted to the service computer system via the user computer system.

8. The method according to claim 7, wherein the ID provider computer system transmits the at least one attribute in the form of a SAML object to the service computer system.

9. A method according to claim 1, wherein the soft token is generated by the service computer system by way of a blind signature or as a U-Prove token.

10. A method according to claim 1, wherein a second asymmetric cryptographic key pair is associated with the soft token, the secret key of the second key pair being encrypted with the public key of the first key pair and stored in a memory of the electronic device.

11. A method according to claim 1, wherein the ID token is a document comprising an electronic memory that is integrated into the document body, the at least one attribute being stored in the electronic memory.

12. A method according to claim 1, wherein the electronic device is designed as a computer system, in particular as a PC, and the user computer system is designed as a mobile computer, in particular as a smart phone, a public key of the first key pair being stored in a readily readable memory area of the secure element, the method further comprising:
    transmitting the public key from the secure element to the mobile computer via a local connection; and
    transmitting the public key and the entered one-time password from the mobile computer to the service computer system via the second cryptographically secure connection.

13. A method according to claim 1, wherein the one-time password is output by displaying a machine-readable optical pattern on a display, and the one-time password is entered by electronically capturing the optical pattern.

14. A non-transitory computer-readable medium having computer-executable instructions that, when executed by a processor, cause the processor to perform a method for generating a soft token, the method comprising:
    establishing a first cryptographically secure connection to an electronic device;
    receiving a request for the generation of a soft token from the electronic device via the first connection;
    generating a one-time password after having received the request;
    transmitting the one-time password to the electronic device via the first connection;
    establishing a second cryptographically secure connection to a user computer system;
    receiving the one-time password from the user computer system via the second connection;
    checking whether the generated one-time password agrees with the received one-time password; and
    generating the soft token by signing at least one attribute that is read from an ID token and a public key associated with the secure element, and transmitting the soft token via the first connection to the electronic device and/or via the second connection to the user computer system, provided that the check showed that the generated and the received one-time passwords agree with each other.

15. A service computer system for generating a soft token that is tied to a secure element, comprising:
    a first network interface operable to provide a first cryptographically secure connection to an electronic device and operable to receive request for the generation of the soft token from the electronic device;
    a processor operable to generate a one-time password in response the request and operable to transmit the one-time password to the electronic device via the first connection; and
    a second network interface, a operable to provide a second cryptographically secure connection to a user computer system and operable to receive the one-time password from the user computer system via the second connection;
wherein the processor is further operable to:
    check whether the generated one-time password agrees with the received one-time password; and to generate the soft token by signing at least one attribute that is read from an ID token and a public key associated with the secure element, and
    transmit the soft token via the first connection to the electronic device and/or via the second connection to the user computer system, provided that the check showed that the generated and the received one-time passwords agree with each other.

16. A data processing system comprising a service computer system according to claim 15 and an ID provider computer system, wherein the ID provider computer system comprises:
    a network interface, operable to receive an attribute specification from the service computer system, the attribute specification specifying at least one attribute;
    a processor operable to authenticate the ID token; and operable to read the at least one attribute from the ID token via a protected connection using end-to-end encryption provided that a user associated with the ID token and the ID provider computer system have authenticated themselves with respect to the ID token.

17. The data processing system according to claim 16, further comprising the secure element, wherein the secure element comprises a protected memory area in which a secret key of the first key pair is stored.

* * * * *